Sept. 30, 1924.
L. R. PATTERSON
SPRING WHEEL
Filed Sept. 28. 1923
1,510,414
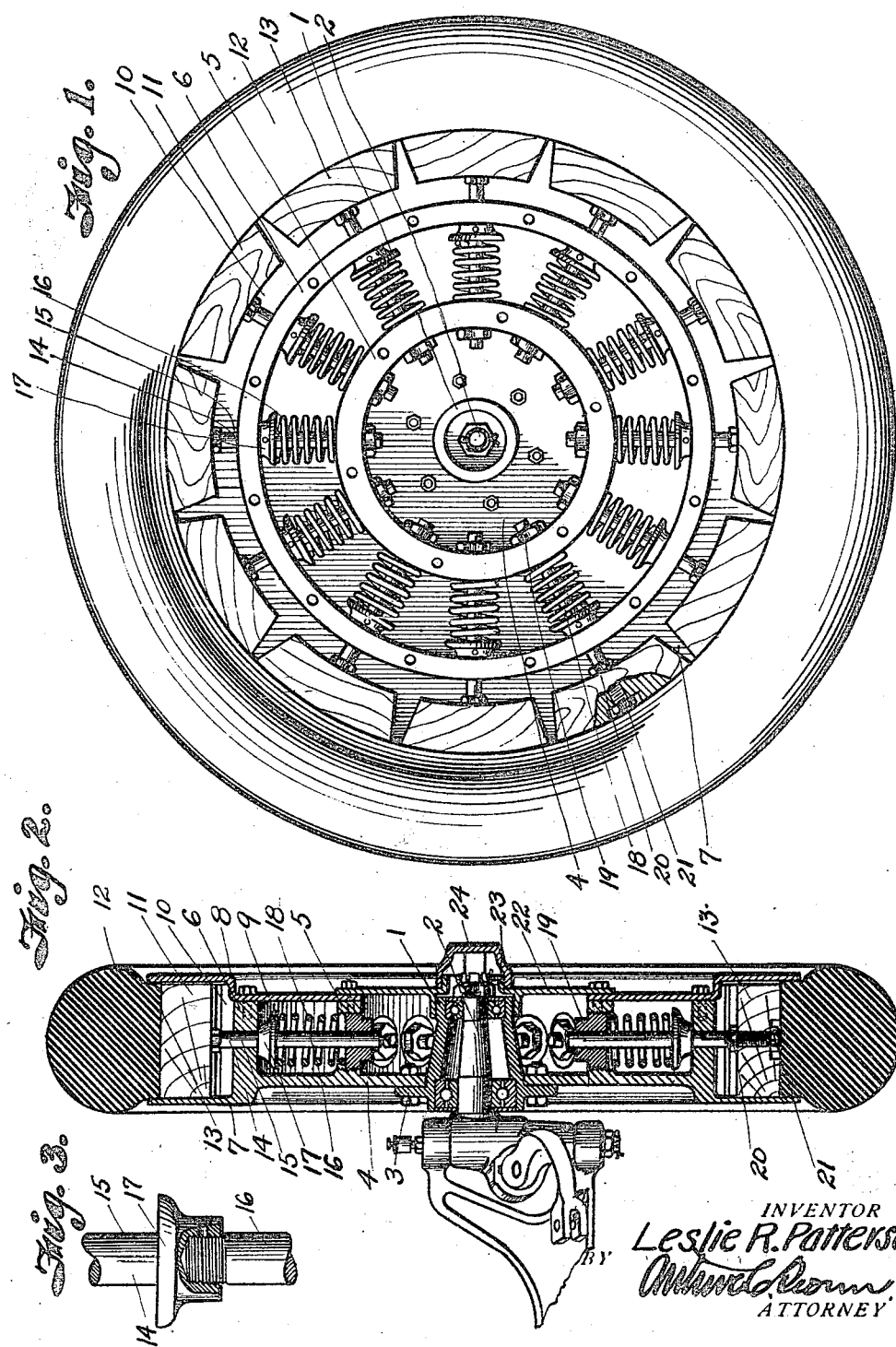
INVENTOR
Leslie R. Patterson
ATTORNEY Patented Sept. 30, 1924.

1,510,414

UNITED STATES PATENT OFFICE.

LESLIE R. PATTERSON, OF KANSAS CITY, MISSOURI.

SPRING WHEEL.

Application filed September 28, 1923. Serial No. 665,384.

*To all whom it may concern:*

Be it known that I, LESLIE R. PATTERSON, a citizen of the United States, residing at Kansas City, in the county of Jackson and State of Missouri, have invented certain new and useful Improvements in Spring Wheels; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to spring wheels in which the resiliency of the wheel is obtained by employing springs grouped about the wheel hub, the springs receiving the shocks communicated to the wheel through the tire, therefore I am enabled to utilize a solid tire which is supported by resilient seats so that it can yieldingly receive the shocks incident to its travel over the road bed.

The peculiar novel features of my invention will be apparent by references to the following description in connection with the accompanying drawings in which—

Fig. 1 is a side elevational view of a wheel constructed in accordance with my invention with the cover plate removed.

Fig. 2 is a vertical longitudinal sectional view through the wheel, and

Fig. 3 is an enlarged fragmentary view through one of the shoe guide rods showing one of the spring seats partly in section.

Referring now to the drawings by numerals of reference:

1 designates the hub which may be of any appropriate construction adapted to receive the axle spindle 2 in the usual way. The hub carries a circumferential flange 3 to which is secured a circular disc 4. The disc 4 is provided with outstanding annular flanges 5 and 6 concentric with the center of the wheel. The disc 4 is provided with an off set portion 7 which co-operates with the off set portion 8 of the circular cover plate 9 to provide an annular recess 10 for the tire seats or shoes 11 on which the tire 12 is mounted. The shoes or seats consist of arcuate blocks or segments 13 which are rigidly secured to the tire seat or shoe guide rods 14. The guide rods each consist of two members 15 and 16 which are connected by a thimble 17 which constitutes a spring seat for the coil spring 18. There is a coil spring about each guide rod; one end of each coil spring butts against the seat or thimble 17 and the other against a plug 19 threaded in the flange 5. Each plug 19 is polygonal so it can be adjusted in the flange 5, to vary the tension of its spring 18, whereby the resiliency of the wheel can be varied. Each member 15 of each guide rod is bolted to the shoe 13 which it carries, the shoe being held in place by the nuts 20 and 21. It will be observed that the inner edge of the circular cover plate 9 is adjacent to the flange 5 leaving an opening which may be closed by a cover plate 22 bolted to the flange 5 and having an outstanding flange 23 to receive a hub cap 24, therefore when it is desired to adjust the springs the hub spring and cover plate 22 may be removed so that the nuts 19 will be accessible permitting them to be adjusted by an appropriate wrench. It will be apparent that by grouping the springs equal distances about the axial center of the wheel radial thrusts will be imparted to the shoes or tire seats so that the tire will be uniformly and resiliently secured to the wheel. The blocks or seats 11 are guided in the annular recess formed by the off set portions of the plates 4 and 9 and the outward movements of the respective blocks is limited by the thimble 17. It will be clear from the foregoing that the tensions of the springs can be varied conveniently and that the shocks to which the solid tire is subjected will be absorbed by the springs 18.

What I claim and desire to secure by Letters-Patent is:

A wheel comprising a hub having a circumferential flange, a ring-shaped disk carried by the flange provided with outstanding annular flanges concentric with the center of the wheel, the disk being provided with an offset portion, a ring shaped cover plate co-operating with the off-set portion to provide an annular recess, arcuate blocks in the recess, radial guide rods, each consisting of two members, thimbles connecting the two members to form spring seats, coil springs about the guide rods resting on the seats, nuts carried by the inner circumferential flange on the ring-shaped disk against which the ends of the springs bear, the opposite ends of the springs bearing against the thimbles, the nut being adjustable in the flanges to vary the tension of the spring, means for securing each guide rod to a shoe, the other end of each guide rod passing through a nut and a tire about the segmental blocks.

In testimony whereof I affix my signature.

LESLIE R. PATTERSON.